United States Patent
Jeske

(10) Patent No.: US 10,534,243 B2
(45) Date of Patent: Jan. 14, 2020

(54) GAME CAMERA MOUNTING SYSTEM

(71) Applicant: Richard Henry Jeske, Summit Lake, WI (US)

(72) Inventor: Richard Henry Jeske, Summit Lake, WI (US)

(73) Assignee: Richard Henry Jeske, Summit Lake, WI (US)

( * ) Notice: Subject to any disclaimer, the term of this patent is extended or adjusted under 35 U.S.C. 154(b) by 0 days.

(21) Appl. No.: 16/232,170

(22) Filed: Dec. 26, 2018

(65) Prior Publication Data

US 2019/0196304 A1 Jun. 27, 2019

Related U.S. Application Data

(60) Provisional application No. 62/708,860, filed on Dec. 26, 2017, provisional application No. 62/709,058, filed on Jan. 4, 2018.

(51) Int. Cl.
| | | |
|---|---|---|
| *G03B 17/56* | (2006.01) | |
| *F16M 13/02* | (2006.01) | |
| *B25G 1/04* | (2006.01) | |
| *B25B 15/00* | (2006.01) | |
| *F16B 23/00* | (2006.01) | |

(52) U.S. Cl.
CPC .......... *G03B 17/561* (2013.01); *B25B 15/004* (2013.01); *B25G 1/043* (2013.01); *F16B 23/0007* (2013.01); *F16M 13/02* (2013.01); *F16M 13/022* (2013.01); *F16M 2200/08* (2013.01)

(58) Field of Classification Search
None
See application file for complete search history.

(56) References Cited

U.S. PATENT DOCUMENTS

| | | | | |
|---|---|---|---|---|
| 704,666 | A * | 7/1902 | Stephens | F21V 21/08 248/207 |
| 1,582,381 | A * | 4/1926 | Citero | F16M 13/02 248/217.4 |
| 2,012,941 | A * | 9/1935 | Corron | F16M 13/02 248/546 |
| 2,375,214 | A * | 5/1945 | Creedon | F16M 13/02 248/126 |
| 2,560,556 | A * | 7/1951 | Creedon | F16M 13/02 248/217.4 |

(Continued)

OTHER PUBLICATIONS

Spy High Mounting System; https:/www.spyhighmounts.com/; 9 pages.

*Primary Examiner* — William B Perkey
(74) *Attorney, Agent, or Firm* — Boyle Fredrickson, S.C.

(57) ABSTRACT

A camera mounting system includes a mount and a mounting bracket removably coupled to the mount. The mount includes a plate and a screw extending rearward of the plate. The mounting bracket includes a tab and a base pivotably coupled to the tab. A camera may be mounted to the mounting bracket. In addition, a tool having a bit and configured to to interfit with a head of the screw to secure may be used to secure the mount to a tree-like object. The tool is further configured to interfit with an orifice formed in the mounting bracket and allow a user to lift the mounting bracket and removably couple the mounting bracket to the mount.

20 Claims, 20 Drawing Sheets

(56) References Cited

U.S. PATENT DOCUMENTS

| | | | | |
|---|---|---|---|---|
| 5,626,322 | A * | 5/1997 | Braun | F16M 11/10 |
| | | | | 248/274.1 |
| 5,669,592 | A * | 9/1997 | Kearful | F16M 11/14 |
| | | | | 248/217.4 |
| 8,087,626 | B1 * | 1/2012 | Weeden | F16M 11/14 |
| | | | | 248/218.4 |
| 2003/0133708 | A1 * | 7/2003 | Tatera | G03B 17/566 |
| | | | | 396/428 |
| 2008/0001057 | A1 * | 1/2008 | Holmberg | F16M 13/00 |
| | | | | 248/674 |
| 2008/0099655 | A1 * | 5/2008 | Goodman | F16M 11/14 |
| | | | | 248/674 |
| 2011/0222842 | A1 * | 9/2011 | Schippers | F16M 11/10 |
| | | | | 396/428 |
| 2017/0075197 | A1 | 3/2017 | DeMers et al. | |
| 2018/0004071 | A1 | 1/2018 | DeMers et al. | |
| 2018/0109704 | A1 * | 4/2018 | Gilbert | H04N 5/2253 |
| 2019/0196304 | A1 * | 6/2019 | Jeske | G03B 17/561 |
| 2019/0236919 | A1 * | 8/2019 | Mehdi | F16M 11/041 |

* cited by examiner

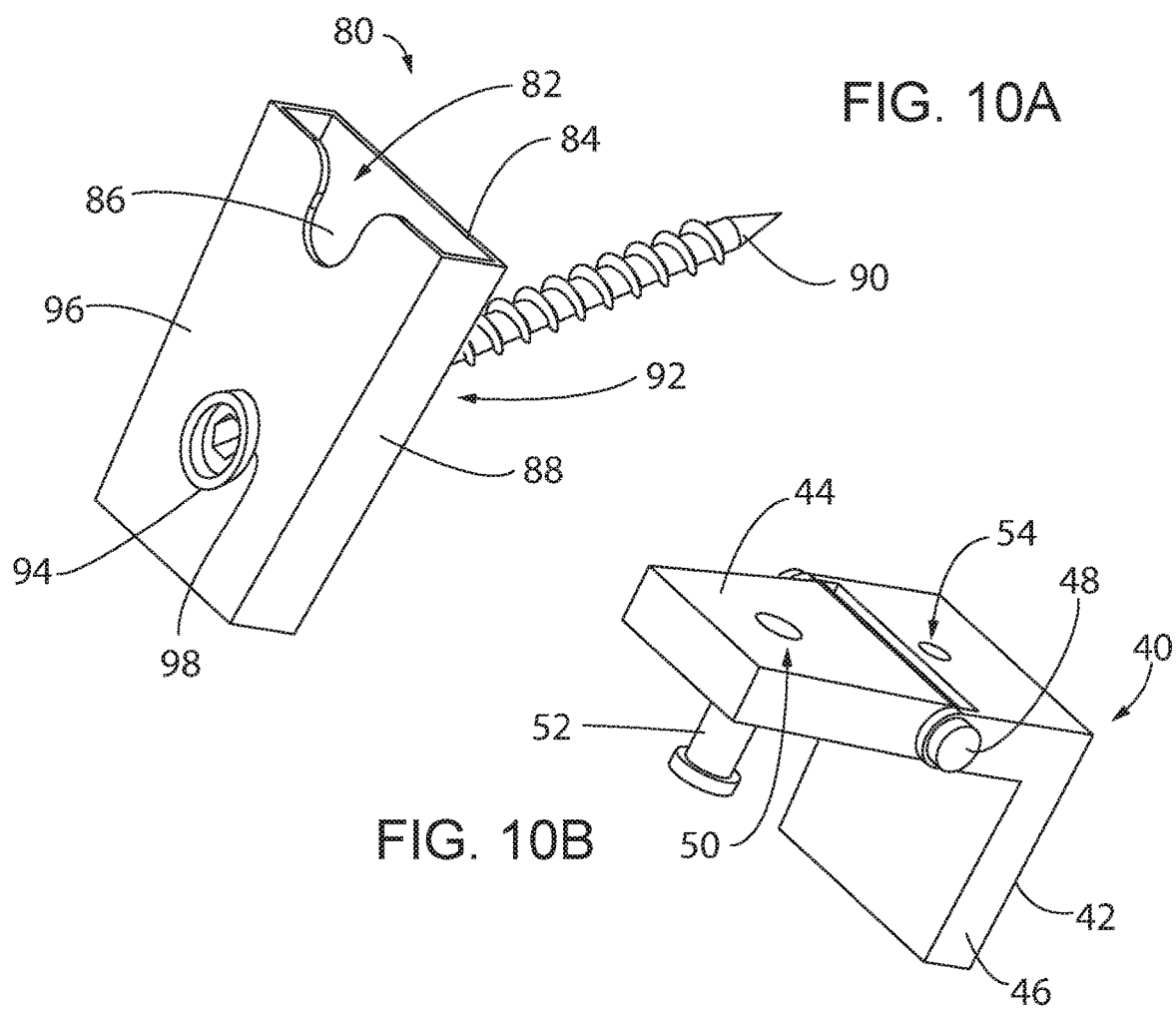
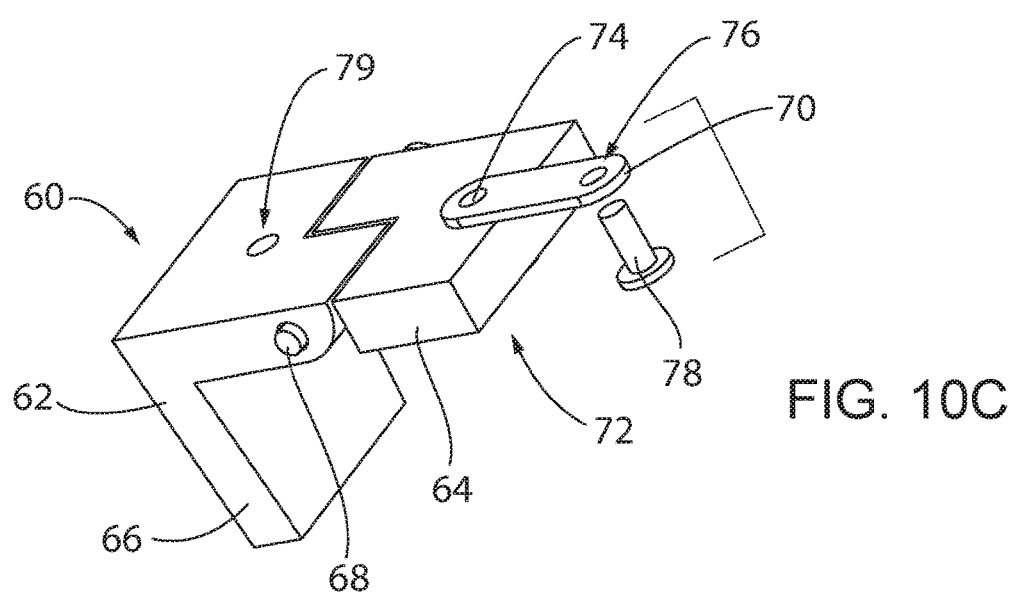

GAME CAMERA MOUNTING SYSTEM

CROSS-REFERENCE TO RELATED APPLICATIONS

This application claims priority to U.S. Provisional Application No. 62/708,860, filed on Dec. 26, 2017, and U.S. Provisional Application No. 62/709,058, filed on Jan. 4, 2018, the entire contents of which are both incorporated by reference.

BACKGROUND OF THE INVENTION

The instant invention relates to systems for mounting a game camera to a tree. Game cameras (also known as trail cameras) are well-known to hunters, game managers and law enforcement personnel. The owner of a game camera or cameras place the cameras unattended at a desired location. Movement of game animals within the range of a camera activates the camera to record an image or images or video in digital form. Since game cameras are usually left unattended at remote locations, game cameras are subject to theft. Theft of game cameras is a serious problem.

SUMMARY OF THE INVENTION

The instant invention is the discovery of a game camera mounting system that provides a significant degree of protection for a game camera left unattended in a remote location. The game camera mounting system of the instant invention utilizes a plate and screw combination to be screwed into a tree at an elevated position by way of an elongated screw driver. A game camera bracket is provided for attachment to the plate of the plate and screw combination. The game camera is attached to the bracket. The combination of the plate and screw combination with the bracket permits the camera to be readily adjusted to a desired viewing angle. The elongated screw driver permits the system to mount a game camera high in a tree to provide not only theft security for the camera but also to make the camera less apparent to game as well as potential camera thieves.

According to an embodiment of the invention, a camera mounting system includes a mount and a mounting bracket removably coupled to the mount. The mount includes a plate and a screw extending rearward of the plate. The mounting bracket includes a tab and a base pivotably coupled to the tab. Further, a camera may be mounted to the mounting bracket.

In accordance with another aspect of the invention, the camera mounting system may include a tool having a bit secured to a distal end of a telescoping pole. The tool is configured to interfit with a head of the screw to secure the mount to a tree-like object. Additionally, the tool is configured to interfit with an orifice formed in the mounting bracket to allow a user to removably couple the mounting bracket to the mount.

In accordance with yet another aspect of the invention, at least one magnet is coupled to a surface of the tab of the mounting bracket in order to removably couple the tab of the mounting bracket to the plate of the mount. The base and the tab are pivotably coupled about a hinge. Further, the hinge may include a tensioning knob to increase or decrease the tension in the hinge.

In accordance with another aspect of the invention, the base of the mounting bracket includes an orifice formed therein. The orifice is configured to receive the tool for adjusting the orientation of the mounting bracket. The tool adjusts the orientation of the mounting bracket by pivoting the base and manipulating a view of the camera vertically. Additionally, the camera may be mounted to the base via a fastener comprising a bolt and a wobble washer. The fastener is configured to manipulate a view of the camera horizontally. Further, the camera may be secured to the mounting bracket via at least one elastic band.

In accordance with yet another aspect of the invention, the screw extends from the plate at an angle less than perpendicular. Further, the screw may include a screw head aligned with a front surface of the plate.

According to another embodiment of the invention, a camera mounting system includes a mount, a mounting bracket, and a tool. The mount includes a plate and a screw extending from a rear surface of the plate. The screw includes a head aligned with a front surface of the plate. The mounting bracket includes a tab removably coupled to the plate of the mount and a base pivotably coupled to the tab via a hinge. The tool includes a bit and is configured to interfit with a head of the screw to secure the mount to a tree-like object. The tool is also configured to interfit with an orifice formed in the mounting bracket to allow a user to lift the mounting bracket and removably couple the mounting bracket to the mount.

In accordance with another aspect of the invention, the mounting bracket includes at least one magnet adhered to a surface of the tab. The tab and the plate of the mount are removably coupled via the magnet. Additionally, the hinge may include a tensioning knob to increase or decrease the requisite force to pivot the base about the hinge.

In accordance with yet another aspect of the invention, an orifice may be formed in the base of the mounting bracket and configured to receive a fastener to secure a camera to the base of the mounting bracket. The fastener may include a bolt and wobble washer configured to manipulate a view of the camera from side to side.

In accordance with another aspect of the invention, the tool may be configured to interfit with with an orifice formed in the mounting bracket to pivot the base of the mounting bracket to manipulate a view of the camera up and down. Further, the tool may include a telescoping pole, and the bit is secured to a distal end of the telescoping pole.

According to yet another embodiment of the invention, a camera mounting system includes a mount, a mounting bracket, a tool, and a camera. The mount includes a plate and a screw extending from a rear surface of the plate at an angle. The screw includes a head aligned with a front surface of the plate. The mounting bracket includes a tab removably coupled to the plate of the mount and a base pivotably coupled to the tab via a hinge. The tool includes a telescoping pole and a bit disposed at a distal end of the telescoping pole. The bit may be configured to interfit with a head of the screw to secure the mount to a tree-like object. In addition, the bit may be configured to interfit with an orifice formed in the mounting bracket to allow a user to removably couple the mounting bracket to the mount. Further, the camera may be secured to the base of the mounting bracket via a fastener.

In accordance with another aspect of the invention, at least one magnet is couple to a surface of the tab of the mounting bracket. In turn, the magnet removably couples the tab of the mounting bracket to the plate of the mount.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications. Further, although many methods and materials similar or equivalent to those described herein may be used in the practice of the present invention, a few such suitable methods and materials are described in greater detail below.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 10A is a perspective view of a mount according to another embodiment of the invention;

FIGS. 10B and 10C are perspective views of mounting brackets configured to interfit with the mount of FIG. 10A, according to different embodiments of the invention;

Figure 1:
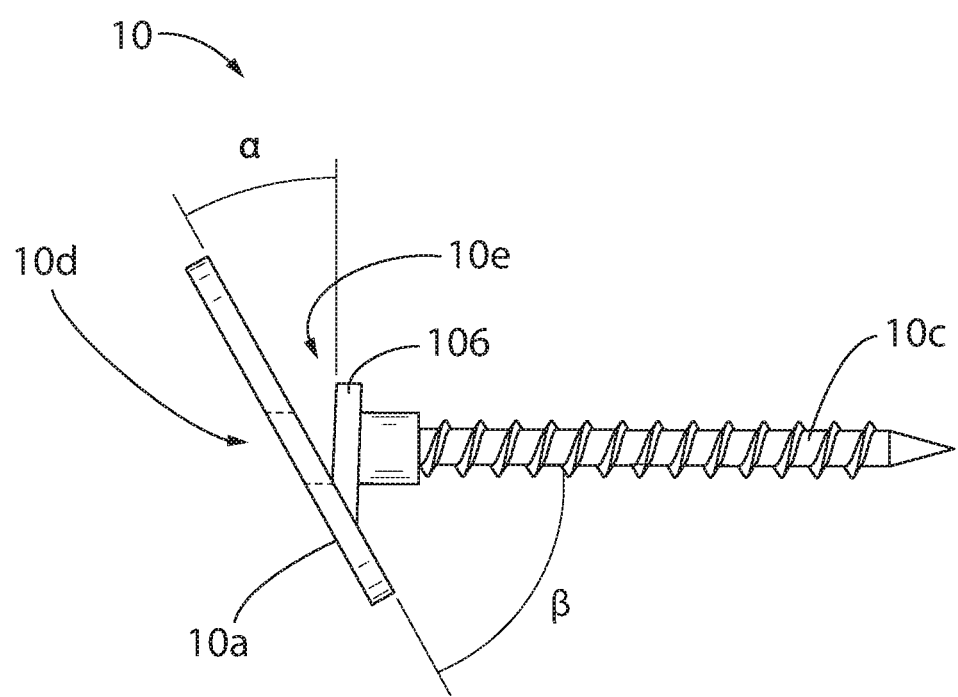
FIG. 1 is a side view of a mount according to an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE INVENTION

The present invention and the various features and advantageous details thereof are explained more fully with reference to the non-limiting embodiments described in detail in the following description.

Referring first to FIG. 1, a mount 10 of a camera mounting system 9 is shown according to an embodiment of the invention. The mount 10 includes a plate 10a, a tab 10b, and a screw 10c. In the representative embodiment of the invention, the tab 10b is permanently coupled to the plate 10a. For example, an edge of the tab 10b may be welded to a surface of the tab 10b. As shown in FIG. 1, the tab 10b may be oriented at an angle α from the plate 10a. While FIG. 1 depicts the angle α as being 30 degrees, it is contemplated that the plate 10a and tab 10b may be oriented at any angle with respect to each other. Further, the plate 10a and tab 10b each include an orifice 10d, 10e, respectively.

Figure 2:
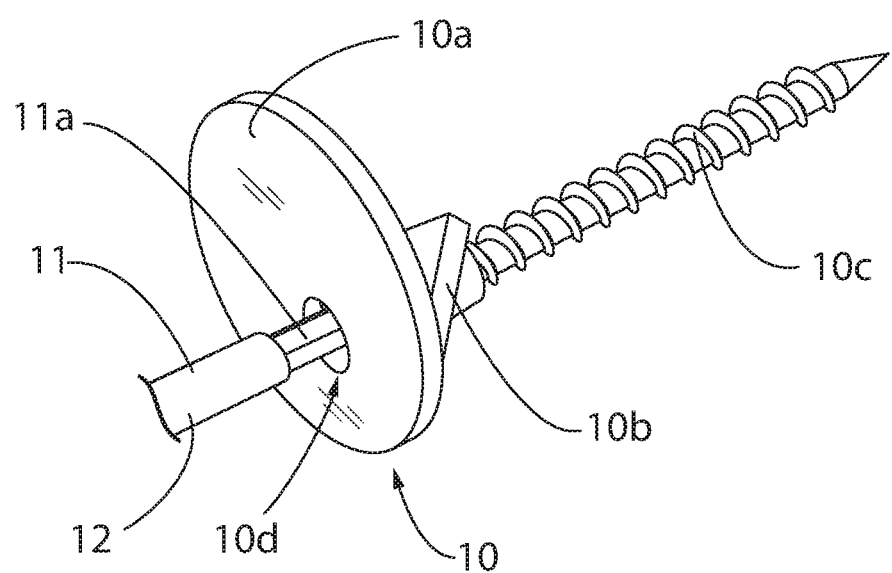
FIG. 2 is a perspective view of the mount of FIG. 1 and a mounting tool according to an embodiment of the invention.

The screw 10c is inserted through the orifice 10e of the tab 10b, so that the head of the screw 10c is disposed on a first side of the tab 10b and the threaded portion of the screw 10c is disposed on a second side of the tab 10b. As a result, the screw 10c extends rearward of the plate 10a. The screw 10c may be oriented perpendicular to the tab 10b and at any angle with respect to the plate 10a. In one example, the screw 10c may be oriented with respect to the plate 10a at an angle β of 60 degrees. In addition, the head of the screw 10c may be welded to the plate 10a in order to permanently secure the screw 10c in place. It is contemplated that the separate elements of the mount 10 may be made of a ferromagnetic material, such as steel. As shown in FIG. 2, the screw 10c may be driven by a tool 11 including a bit 11a, such as a screw driver bit, mounted on a telescoping pole 12. The orifices 10d, 10e are aligned such that the tool 11 and bit 11a may be inserted through the orifice 10d of the plate 10a and still interact with the head of the screw 10c to rotate the screw 10c via the tool 11.

Figure 3:
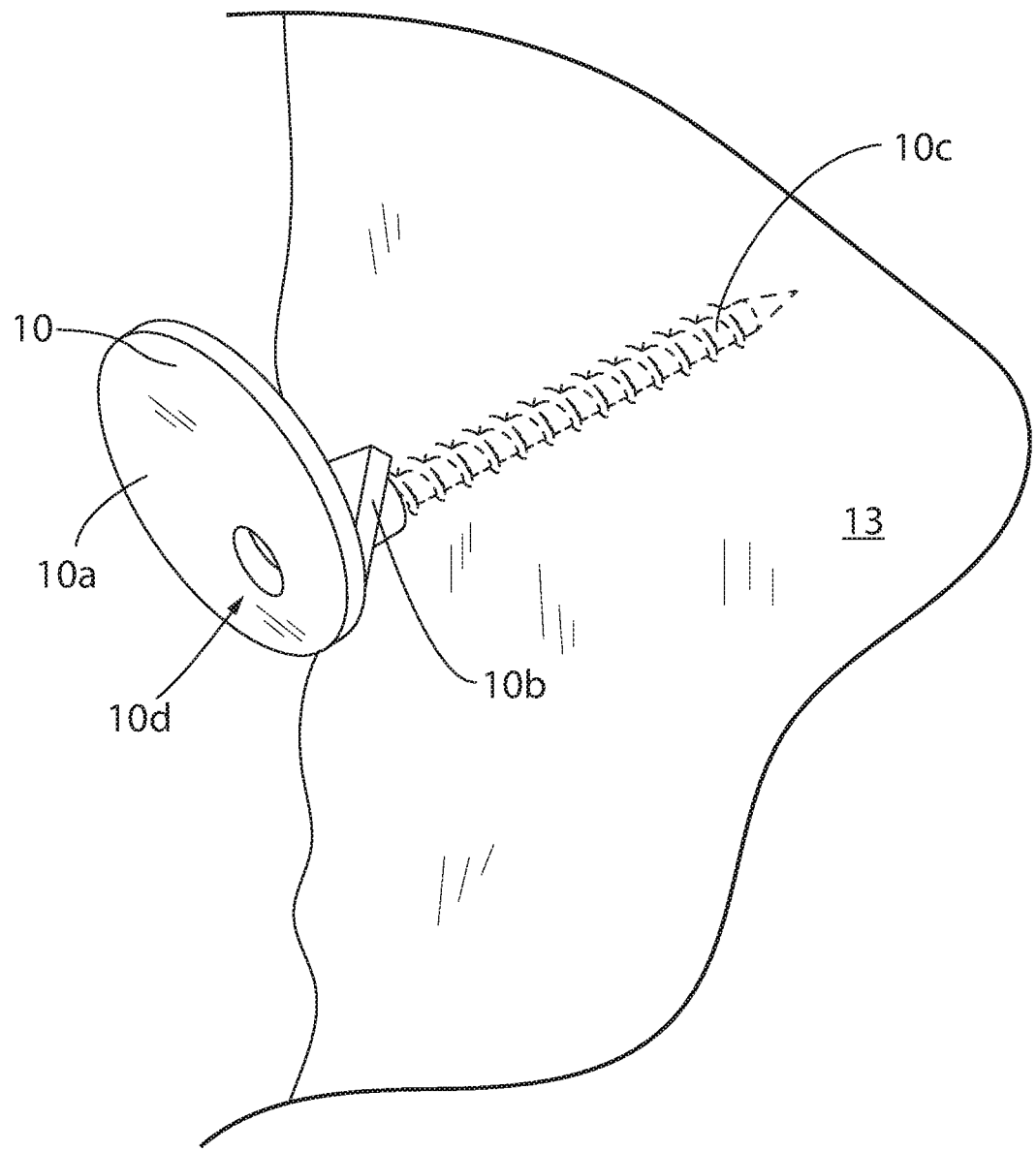
FIG. 3 is a perspective view of the mount of FIG. 1 mounted to the tree.

Now referring to FIG. 3, the mount 10 is shown being secured to an outdoor object 13, such as, but not limited to, a tree. For example, the threaded portion of the screw 10c may be inserted into the tree in order to secure the mount 10 to the tree-like object 13. FIG. 3 illustrates the mount 10 secured to the tree, once the tool 11 has been removed.

Figure 4:
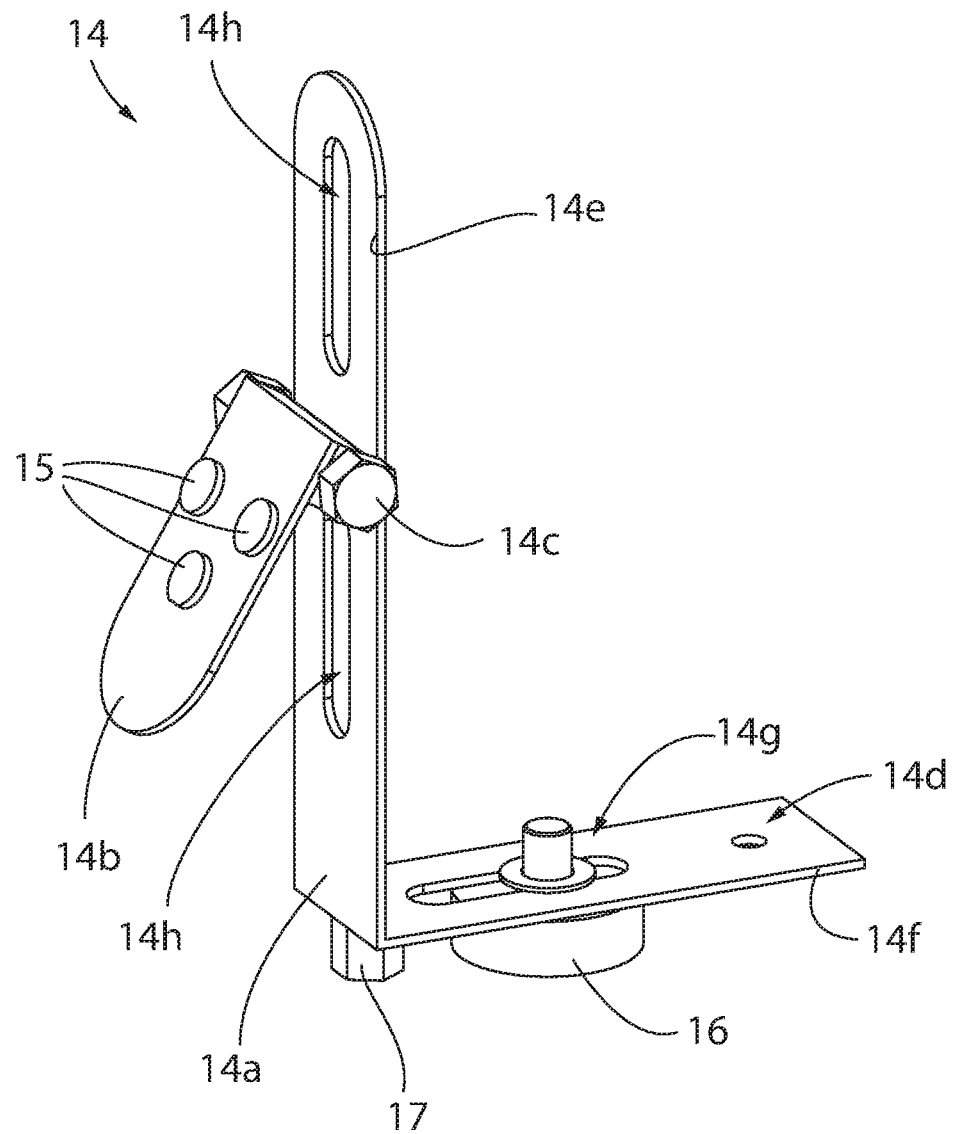
FIG. 4 is a perspective view of a mounting bracket according to an embodiment of the invention.
Figure 5:
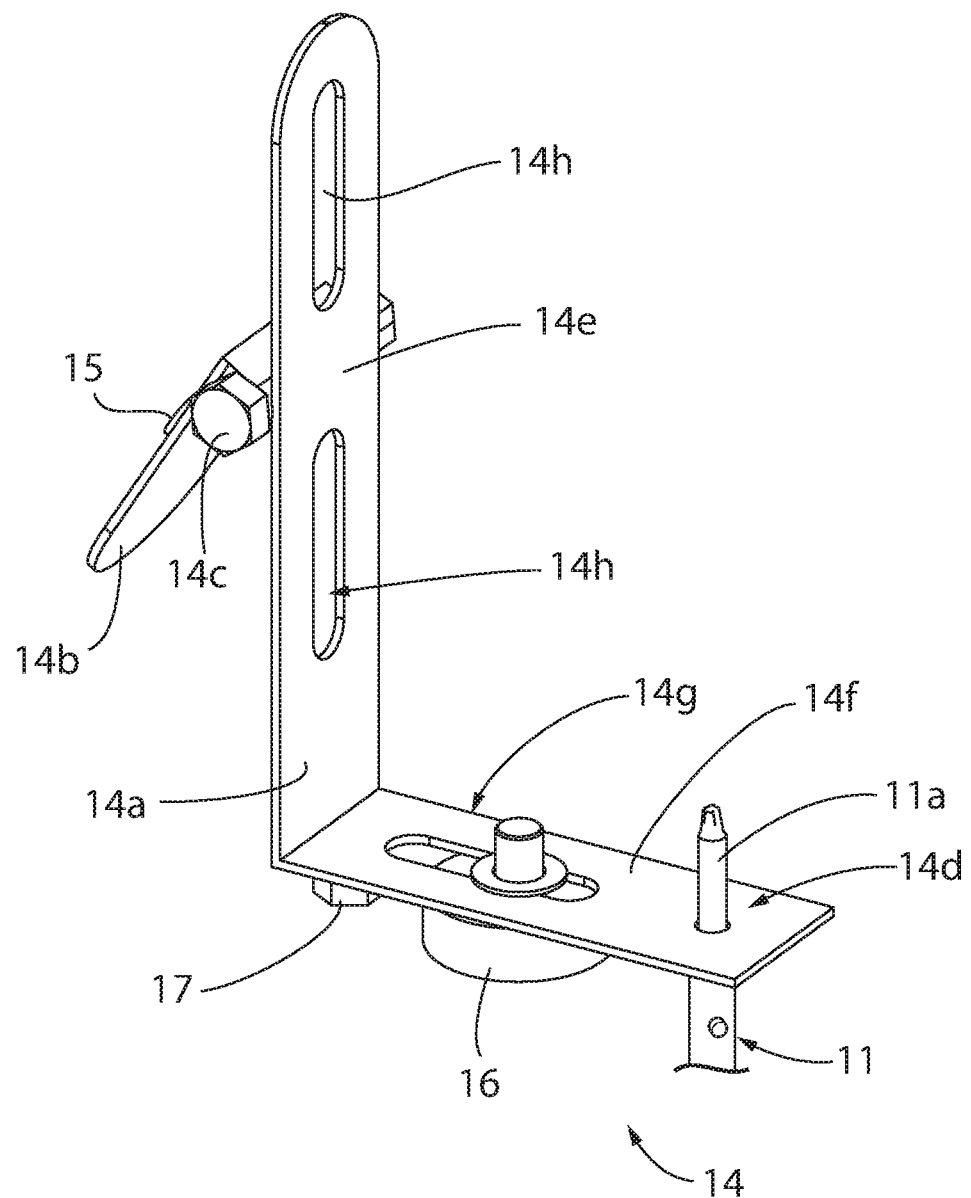
FIG. 5 is a perspective view of the mounting bracket of FIG. 4 attached to the mounting tool.
Figure 6:
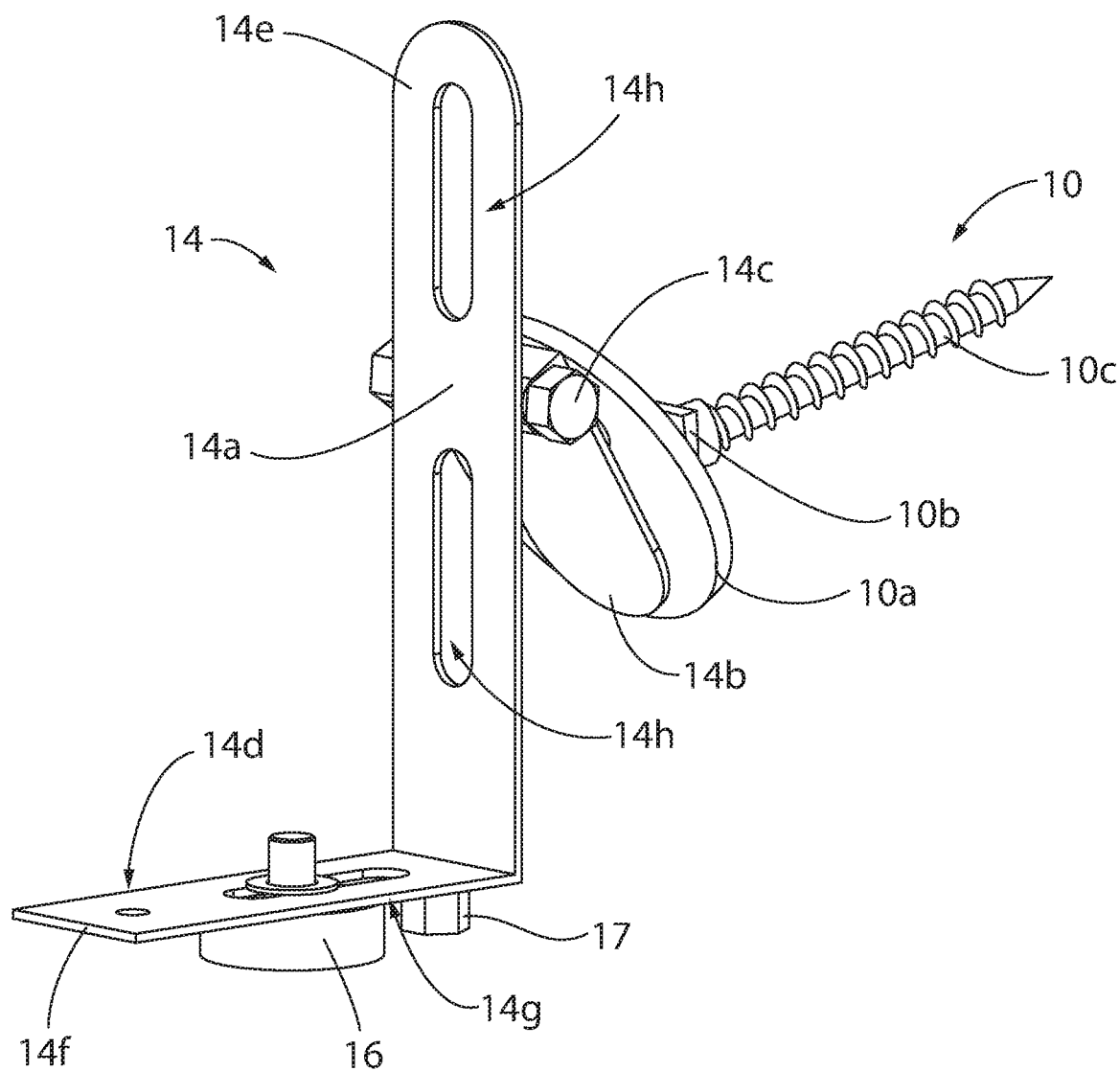
FIG. 6 is a perspective view of the mounting bracket of FIGS. 4 and 5 attached to the mount shown in FIGS. 1-3.

Referring next to FIGS. 4-6, a mounting bracket 14 of the camera mounting system 9 is shown. The mounting bracket 14 includes an angled base 14a, a hinged tab 14b, and a hinge 14c. The bracket 14 may be made of any material, ferromagnetic or otherwise. In the representative embodiment of the invention, the angled base 14a includes a generally vertical portion 14e and a generally horizontal portion 14f. In varying embodiments of the invention, the vertical and horizontal portions 14e, 14f may be oriented perpendicular to each other or at any angle other than perpendicular. Further, the hinged tab 14b is pivotably coupled to the angled base 14a via the hinge 14c. As a result, the hinged tab 14b is able to pivot about the hinge 14c to adjust the orientation of the mounting bracket. While FIGS. 4-6 illustrates the hinged tab 14b as being coupled to the vertical portion 14e of the angled base 14a at a location between the first and second ends of the vertical portion 14e, it is contemplated that the hinged tab 14b may be coupled to the angled base 14a at any location along the length of the vertical portion 14e or any location along the length of the horizontal portion 14f. In addition, magnets 15 may be coupled to a surface of the hinged tab 14b. The benefit of the magnets 15 will be described in further detail below with respect to FIG. 6.

Many game cameras use a mounting nut in the base of the camera, such as, but not limited to a ¼ 20 thread mounting nut. As such, a threaded camera bolt 16, such as, but not limited to a ¼ 20 threaded camera bolt, is provided to assist in coupling a game camera 18 to the mounting bracket 14. The bolt 16 extends through an orifice 14g in the mounting bracket to engage the mounting nut of the camera 18. In the representative embodiment of the invention, the orifice 14g is configured as a slot opening that allows the bolt 16 to be positioned in a variety of locations along a length of the slot. As a result, a variety of game cameras 18 may be coupled to the mounting bracket 14, since the mounting bolt 16 is able to be aligned with the mounting nut of the camera 18.

Figure 7:
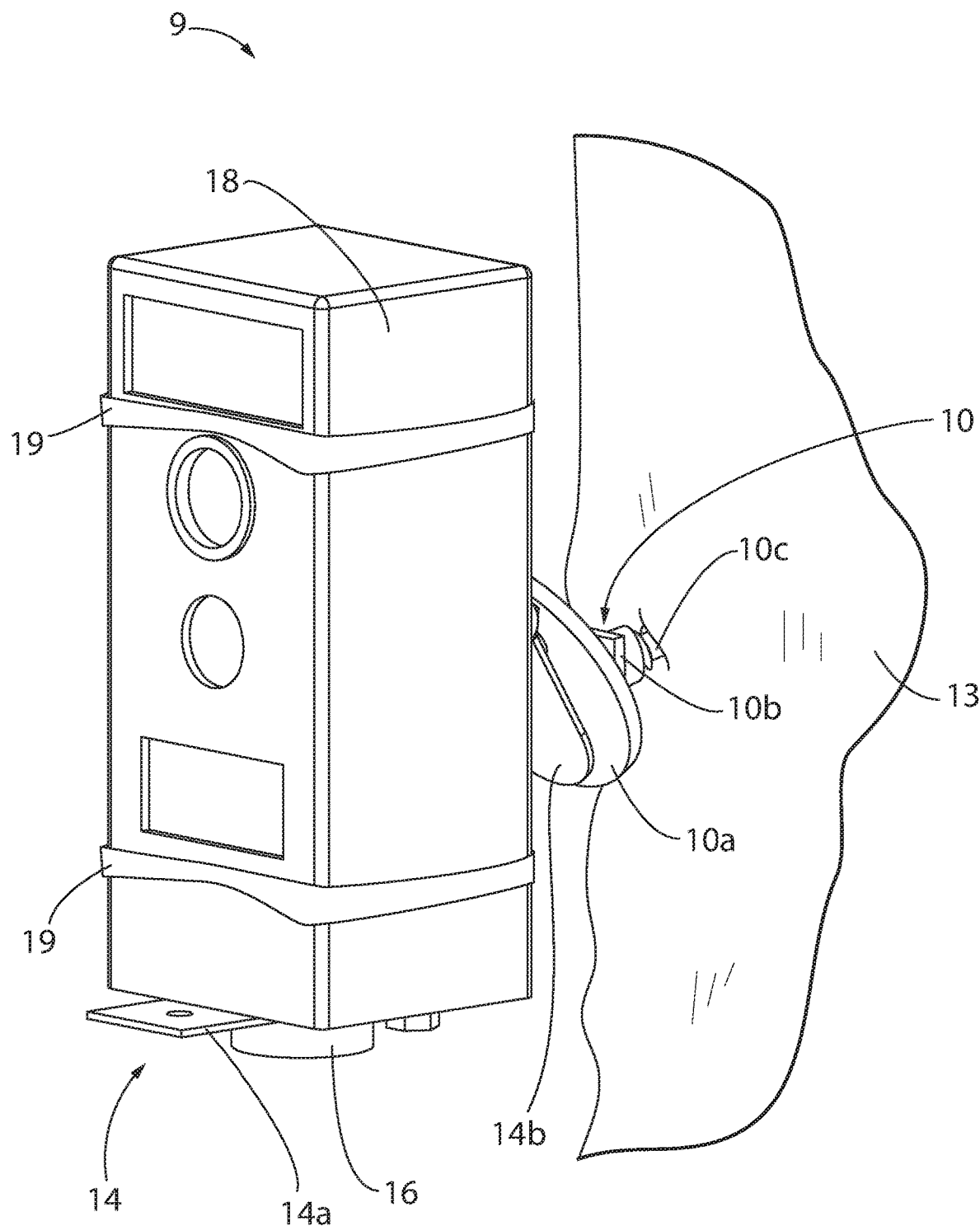
FIG. 7 is a perspective view a game camera attached to the mounting bracket shown in FIGS. 4-6.

Alternatively, the mounting bracket 14 may include at least one orifice 14h formed in the vertical portion 14e of the mounting bracket 14. As such, the bolt 16 may be alternatively positioned through one of the orifices 14h to secure a camera having a mounting nut in the back of the camera. Similar to orifice 14g, orifices 14h may be configured as a slot opening to allow positioned on the bolt 16 in a variety of locations along the length of the slot. As shown in FIG. 7, the game camera 18 may be alternatively or further secured to the mounting bracket 14 via one or more elastic bands 19. For instance, the elastic bands 19 may surround the game camera 18 and the vertical portion 14e of bracket 14. It is also contemplated that rope or twine may be used to secure the camera 18 to the mounting bracket 14.

Referring next to FIG. 5, the bracket 14 may be mounted on the tool 11 by passing the bit 11a through the orifice 14d in the horizontal portion 14f of the angled base 14a. Alternatively, the angled base 14a may include a socket 17 disposed on a bottom surface thereof and configured to receive the bit 11a of the tool 11. As a result, the user is able to use the tool 11 to position the mounting bracket 14. As shown in FIG. 6, the hinged tab 14b of the mounting bracket 14 is placed in contact with the plate 10a of the mount 10, which has been secured to the tree 13. In the representative embodiment of the invention, the magnets 15 secured to the hinged tab 14b magnetically couple the mounting bracket 14 to the mount 10. As a result, the mounting bracket 14 and the mount 10 are removably coupled to each other.

Figure 8:
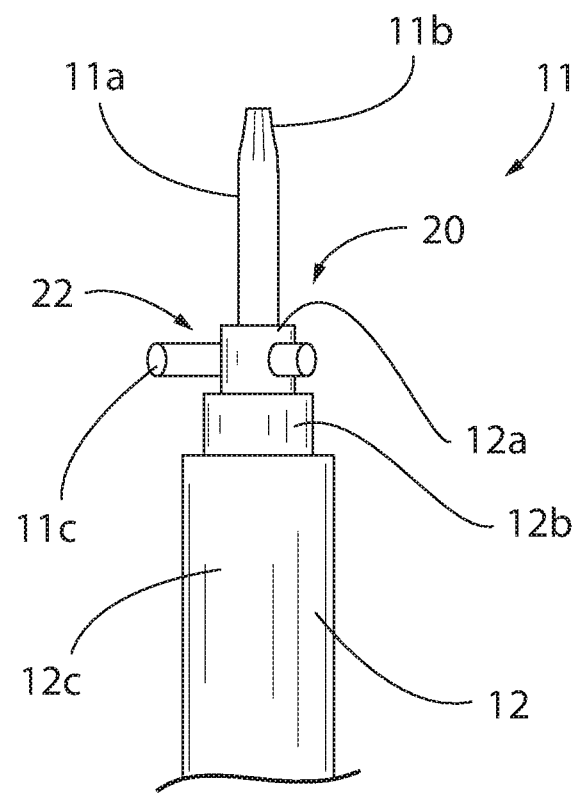
FIG. 8 is a side view a distal end of the mounting tool.

FIG. 8 depicts the tool 11 according to an embodiment of the invention. As discussed above, the tool 11 includes a telescoping pole 12 including a number of segments 12a, 12b, and 12c. It is also contemplated that other embodiments of the invention may include more or less than three (3) segments. The previously discussed bit 11a is shown as being secured to a distal end 20 of the pole 12. The distal end 20 being located at an end 22 of the first segment 12a. A roll pin 11c may assist in securing the bit 11a to the pole 12. As shown, the bit 11a may include a number of splines 11b configured to interfit with the previously discussed screw 10c. As a result, rotation of the tool 11 and bit 11a causes rotation of the screw 10c.

Figure 9:
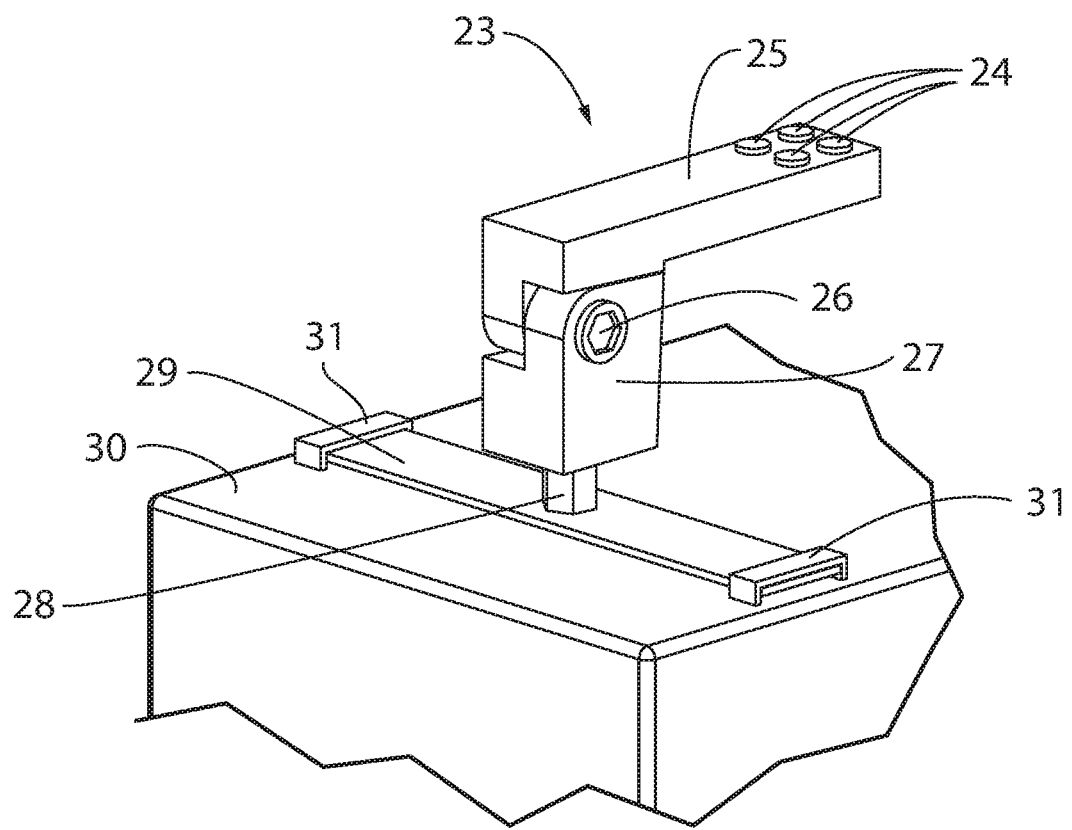
FIG. 9 is a perspective view of a mounting bracket according to another embodiment of the invention.

Referring next to FIG. 9, an alternative game camera mounting bracket 23 is shown for use with game cameras 30 including belt loops 31. A strap 29 may extend between and engage the belt loops 31 of the game camera 30. The bracket 23 may include a tab 25 pivotably coupled to a base 27 via a hinge 26. As a result, the orientation of the tab 25 and base 27 with respect to each other may be adjusted to any angle. Magnets 24 may be coupled to a surface of the hinge tab 25 in order to magnetically couple the bracket 23 to the plate 10a of the mount 10, similar to that previously discussed with mounting bracket 14. The strap 29 is includes an orifice formed therein so that a bolt may extend through from the base 27 of the mounting bracket 23, through the strap 29, and into the back of the camera 30. The bolt may be locked in place by a nut 28, such as a jam nut. Since most game cameras 30 have belt loops, the bracket 23 and strap 29 combination shown in FIG. 9 may be compatible with a large number of commercially available game cameras.

Next, FIGS. 10A-10C depict alternative mounting brackets 40, 60, respectively, that interfit with an alternative mount 80. The mount 80, shown in FIG. 10A, includes a receiving slot 82 formed in a top surface 84 thereof. In other embodiments of the invention, the receiving slot 82 may be formed in other surfaces of the mount 80. The receiving slot 82 may include a cavity 86 formed within the mount 80 that extends the entire length or a partial length of the mount 80. It some embodiments of the invention, sidewalls 88 of the mount 88 may be tapered in order to taper the slot 82 along its length. In other embodiments of the invention, the slot 82 may be tapered along its length without the sidewalls 88 of the mount 88 having a similar taper.

The mount 80 may also include a screw 90 extending from a rear surface 92 thereof, while a head 94 of the screw 90 is disposed at a front surface 96 of the mount 80, in order to be accessible by the tool 11. While the representative embodiment of the invention illustrates the mount 80 being oriented with respect to the screw 90 at an angle less than perpendicular, for example, 60 degrees, it is contemplated that varying embodiments of the invention may have the mount 90 oriented with respect to the screw 90 at any angle more or less than that shown in FIG. 10A. Additionally, the front surface 96 of the mount 90 may include a tool projection 98 extending therefrom. The tool projection 98 is configured to receive the tool 11 and assist a user in aligning the bit 11a with the screw head 94.

FIG. 10B further illustrates a first alternative bracket 40 configured to interfit with the receiving slot 82 of the mount 80. As shown, the bracket 40 includes a tab 42 and a base 44. Sidewalls 46 of the tab 42 may be tapered in order to align with the tapered slot 82. As a result, the tab 42 is configured to interfit with the slot 82. The base 44 is pivotably coupled to the tab 42 about a hinge 48. As a result, the base 44 is able to pivot about the hinge 48 in order to change the angle of orientation with respect to the tab 42. The base 44 further includes an orifice 50 formed therein. The orifice 50 is configured to receive a screw 52 to couple the base 44 of the bracket 40 to a game camera. The view of the camera is adjusted up and down by pivoting the base 44 of the bracket 40 about the hinge 48. The bracket 40 may further include another orifice 54 formed in either the tab 42, as shown in FIG. 10B, or the base 44. The orifice 54 is configured to receive the bit 11a of the tool 11. As a result, a user is able to use the tool 11 to lift the mounting bracket 40 and place the tab 42 within the slot 82 of the mount 80.

FIG. 10C illustrates a second alternative bracket 60 configured to interfit with the receiving slot 82 of the mount 80. Similar to the bracket 40, the bracket 60 includes a tab 62 and a base 64. The tab 62 may include sidewalls 66 that taper in order to align with the tapered slot 82 of the mount 80. The base 64 is pivotably coupled to the tab 62 by way of a hinge 68. As such, the base 64 is able to adjust its angle of orientation with respect to the tab 62 by pivoting about the hinge 68. The bracket 60 further includes a camera plate 70 coupled to the base 64 via fastener 74 at a location adjacent a distal end 72 of the base 64. The camera plate 70 is configured to rotate about the fastener 74. The camera plate 70 includes an orifice 76 formed therein and configured to receive a screw 78 to couple the camera plate 70 to a game camera. By pivoting the base 64 about the hinge 68, the view of the camera is able to be adjusted up and down. Similarly, by rotating the camera plate 70 about the fastener 74, the view of the camera is able to be adjusted left and right. The bracket 60 may further include an orifice 79 formed in either the tab 62, as shown in FIG. 10C, or the base 64. The orifice 79 is configured to receive the bit 11a of the tool 11, in order to allow a user to use the tool 1 to lift the mounting bracket 40 and place the tab 46 within the slot 82 of the mount 80.

Although camera bracket 23 and strap 29 shown in FIG. 9 are attached to plate 10a by magnets, it should be understood that camera bracket 23 can be attached to a tree by any suitable means. For example, if camera bracket 23 were adapted to comprise a male portion like that shown in FIGS. 10B and 10C, then camera bracket 23 could be attached to a tree using the mount in FIG. 10A. Alternatively, if camera bracket 23 were adapted to comprise a post, then camera bracket 23 could be attached to a tree using a receiver attached to the tree, the receiver for receiving the post.

Figure 11A:
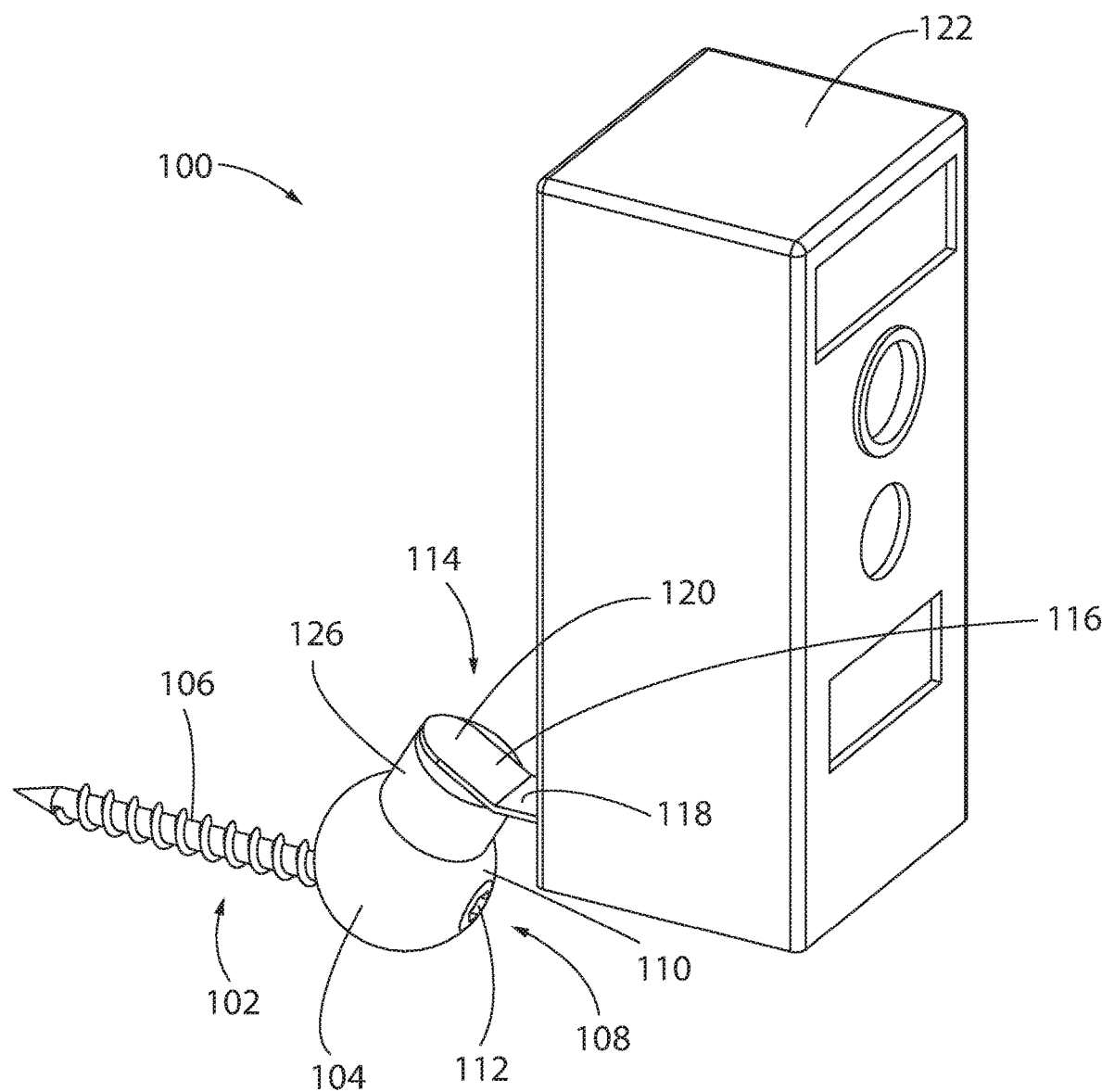
FIG. 11A is a perspective view of a mount and mounting bracket according to yet another embodiment of the invention.

Referring now to FIG. 11A, an alternative camera mounting system 100 is shown. In this representative embodiment of the invention, a mount 102 of the mounting system 100 includes a mounting plate 104 in the form of a ball. A screw 106 then extends rearward from the ball 104, while an opening 108 is formed in a front portion 110 of the ball 104 to access a head 112 of the screw 106. The ball 104 is made of a ferromagnetic material, such as steel. As further shown, a mounting bracket 114 of the camera mounting system 100 includes a base 116. The base 116 may include a lateral portion 118 and an angled portion 120. The camera 122 may be coupled to the lateral portion 118 of the base 116 via a fastener (not shown), such as a bolt. Although the bracket 114 is attached to the camera 122 by a bolt, it is contemplated that if the camera 122 has belt loops, then the bracket 114 can be attached to the camera using a strap according to the instant invention in the manner shown in FIG. 9.

Figure 11B:
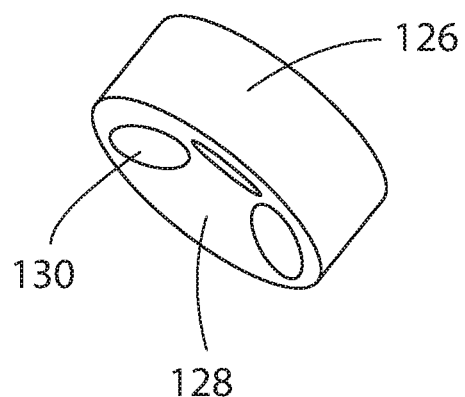
FIG. 11B is a perspective view of a socket of the mounting bracket of FIG. 11A.

Additionally, a socket 126 may be coupled to the angled portion 120 of the base 116. As shown in FIG. 11B, the socket 126 includes an inner surface 128 that is concave and configured to receive the ball 104. At least one magnet 130 is disposed on the inner surface 128 of the socket 126. As a result, the magnets 130 couple the socket 126 of the mounting bracket 114 to the ball 104 of the mount 102. Due to the shape of the ball 104 and the shape of the socket 126, the mounting bracket 114 may be rotated about the ball 104 at any angle. As a result, the view of the camera 122 may freely be moved in any direction by rotating the mounting bracket 114 about the ball 104.

Figure 12:
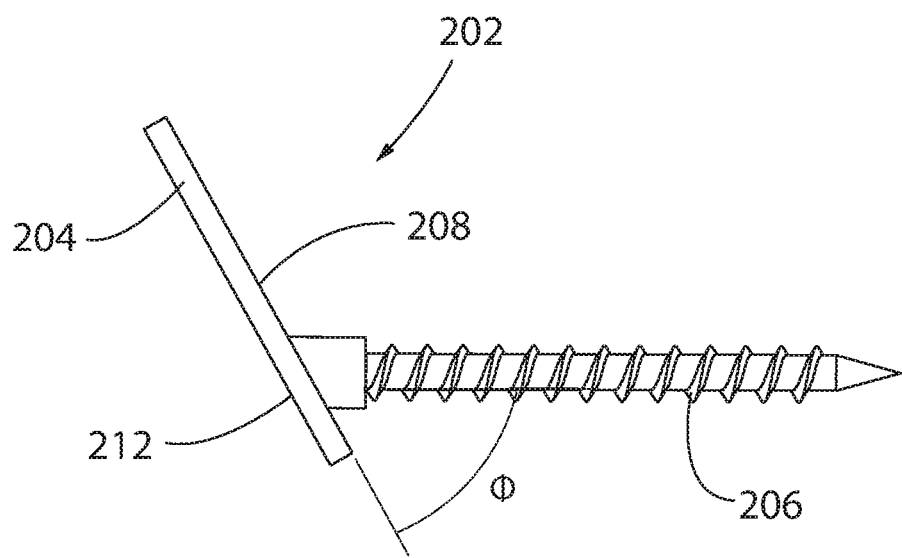
FIG. 12 is a side view of a mount according to yet another embodiment of the invention.

Next, FIGS. 12-20 depict another camera mounting system 200 in accordance with an embodiment of the invention. FIG. 12 illustrates a mount 202 of the mounting system 200. The mount is shown to include a plate 204 and a screw 206 extending from a rear surface 208 of the plate 204. A portion or all of the screw 206 may be threaded. In the representative embodiment of the invention, the screw 206 is welded to the plate 204. However, in other embodiments of the invention, the screw 206 may be coupled to the plate 204 via other known methods. As shown, the screw 206 extends from the plate 204 at an angle φ. While FIG. 12 depicts angle φ as being 60 degrees, it is contemplated that other embodiments of the invention may have the screw 206 extend from the plate 204 at any angle. The screw 206 further includes a head 210 aligned with a front surface 212 of the plate 204. While FIG. 12 depicts the head 210 as being oriented parallel to the front surface 212 of the plate 204, the head 210 may be oriented perpendicular to the screw in other embodiments of the invention. The elements of the mount 202 may be made of a ferromagnetic metal, such as steel.

Figure 13:
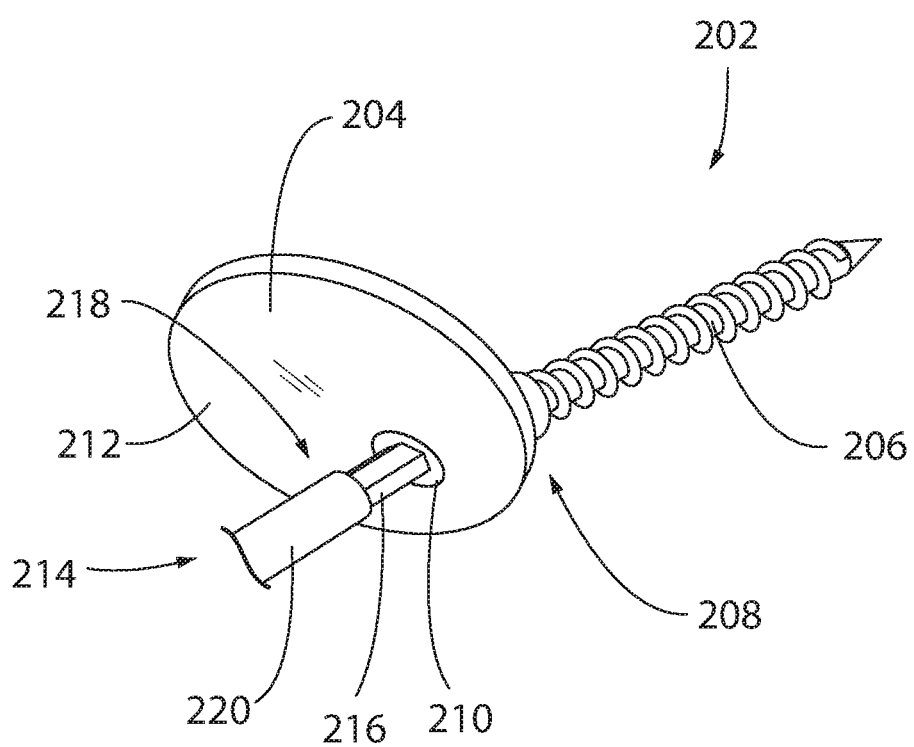
FIG. 13 is a perspective view of the mount of FIG. 12 and a mounting tool according to an embodiment of the invention.
Figure 14:
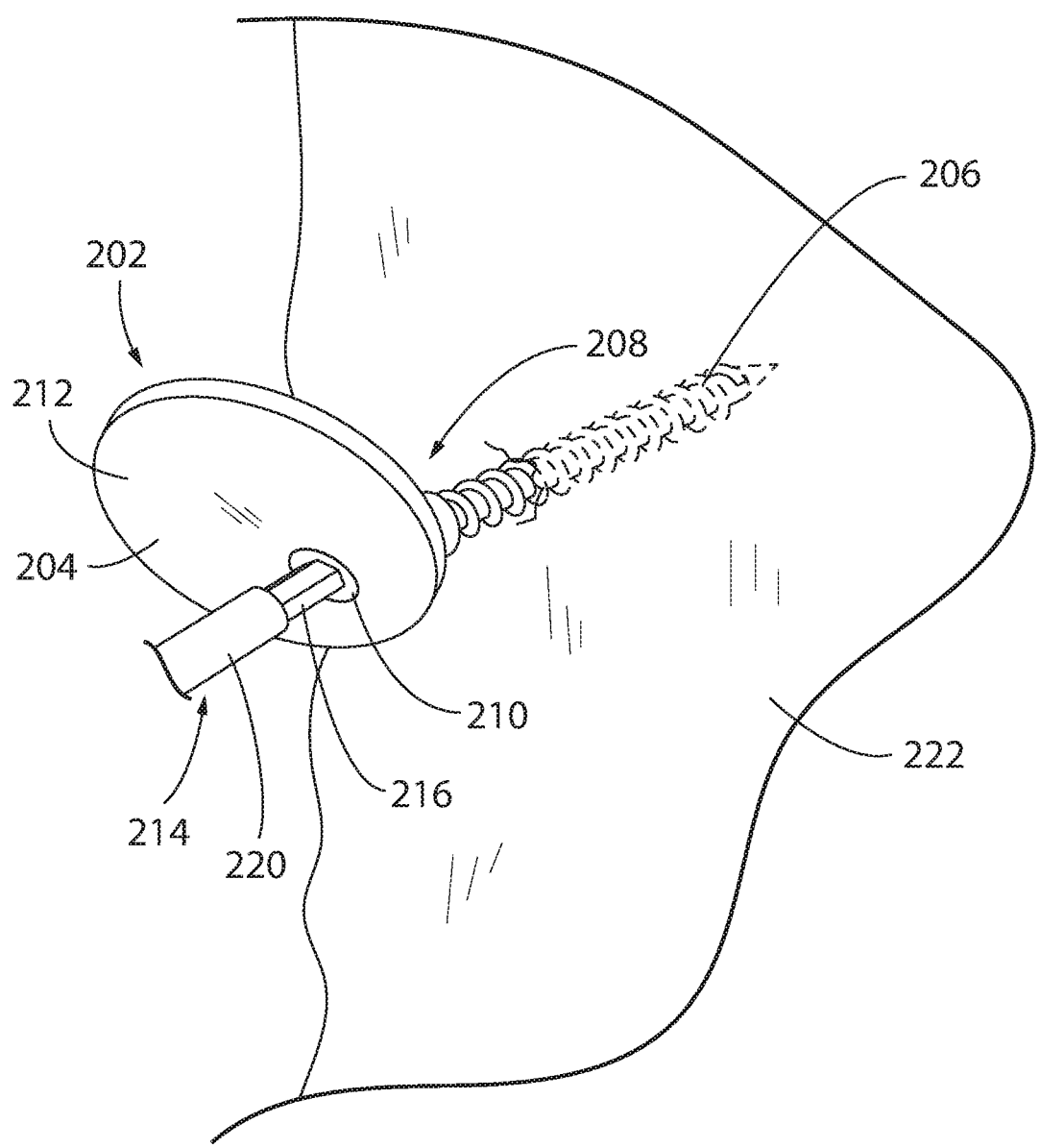
FIG. 14 is a perspective view of the mount of FIG. 12 being mounted to a tree.
Figure 15:
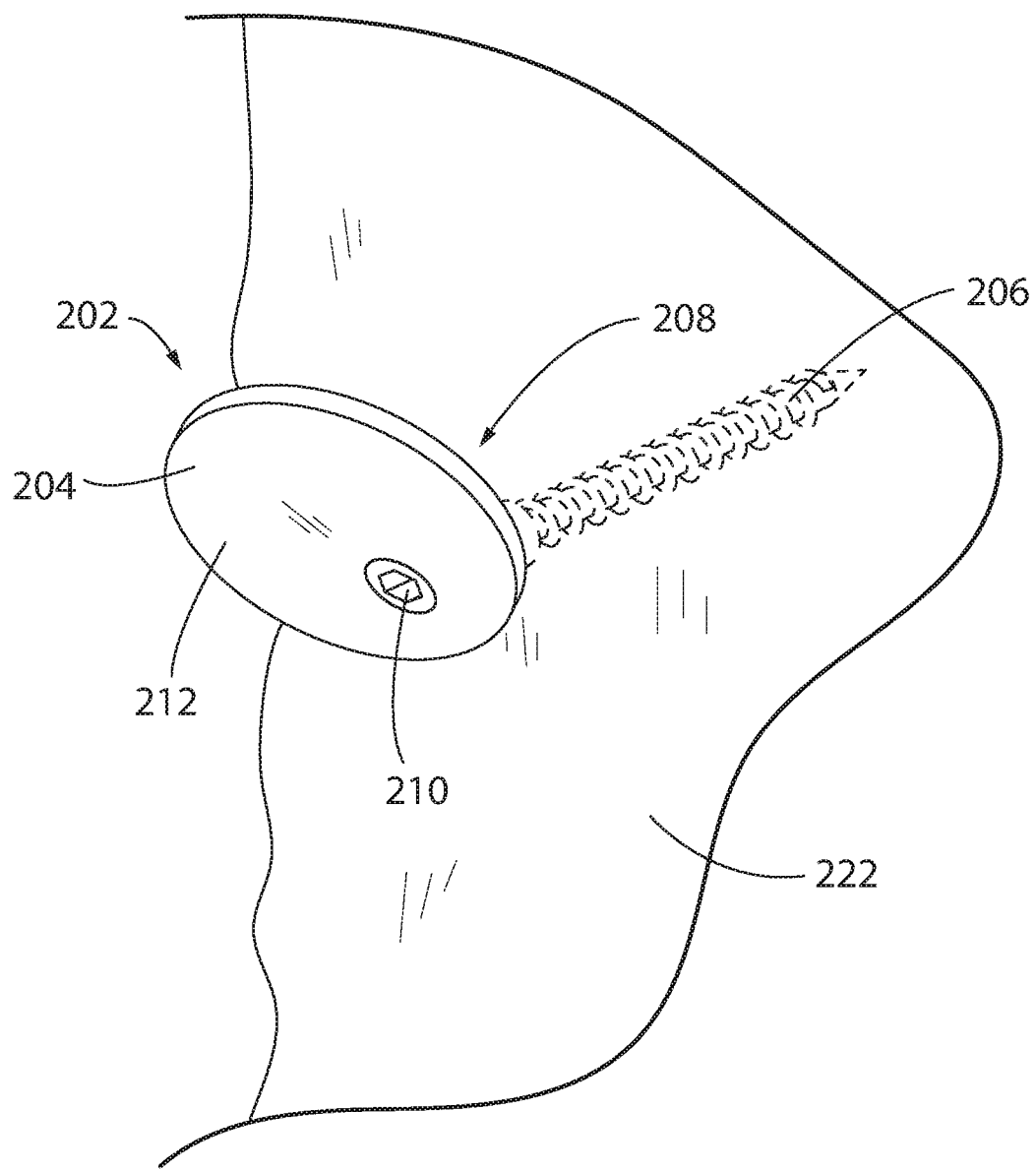
FIG. 15 is a perspective view of the mount of FIG. 12 mounted to the tree.

Next, FIG. 13 illustrates a tool 214, similar to the tool 11 shown in FIG. 8, being used to secured the mount 202 to a tree 216. The tool 214 includes a bit 216 coupled to a distal end 218 of a telescoping pole 220. The telescoping pole 220 includes a number of sections 220n, similar to the telescoping pole 12 shown in FIG. 8. The bit 216 is configured to interfit with the head 210 of the screw 206. As a result, rotation of the tool 212 causes rotation of the screw 206. FIG. 14 further illustrates the tool 214 being used to secure the mount 202 to a tree-like object 222. For example, the threaded portion of the screw 206 may be inserted into the tree in order to secure the mount 202 to the tree 222. As described above, rotation of the tool 214 causes rotation of the screw 206, which causes the screw 206 to be secured to the tree 222. Once the mount 202 has been secured to the tree 222, the tool 214 may be removed from the screw head 210. FIG. 15 depicts the mount 202 secured to the tree 222, once the tool 212 has been removed.

Figure 16:
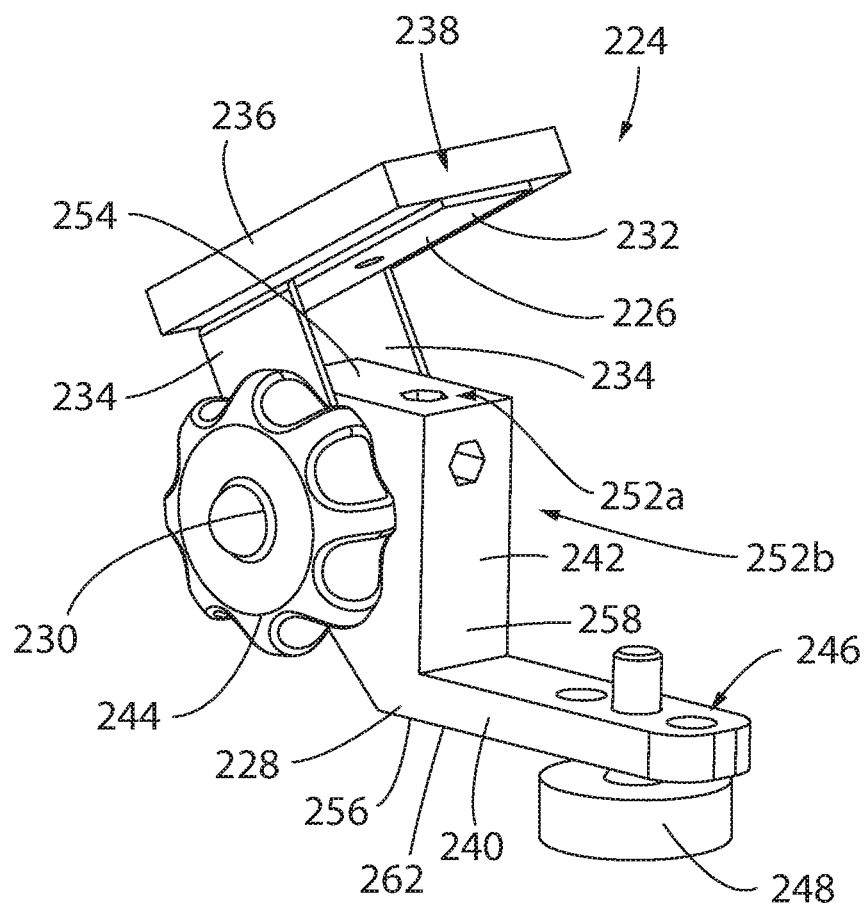
FIG. 16 is a perspective view of a mounting bracket according to yet another embodiment of the invention.
Figure 17:
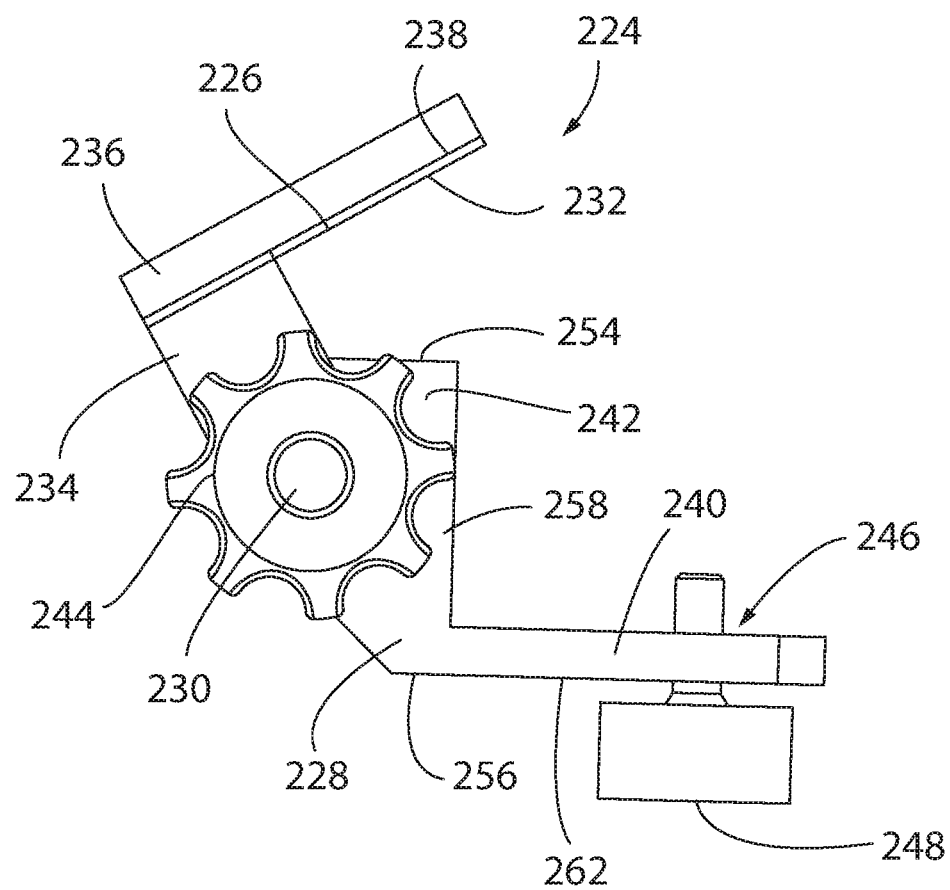
FIG. 17 is a side view of the mounting bracket of FIG. 16.
Figure 18:
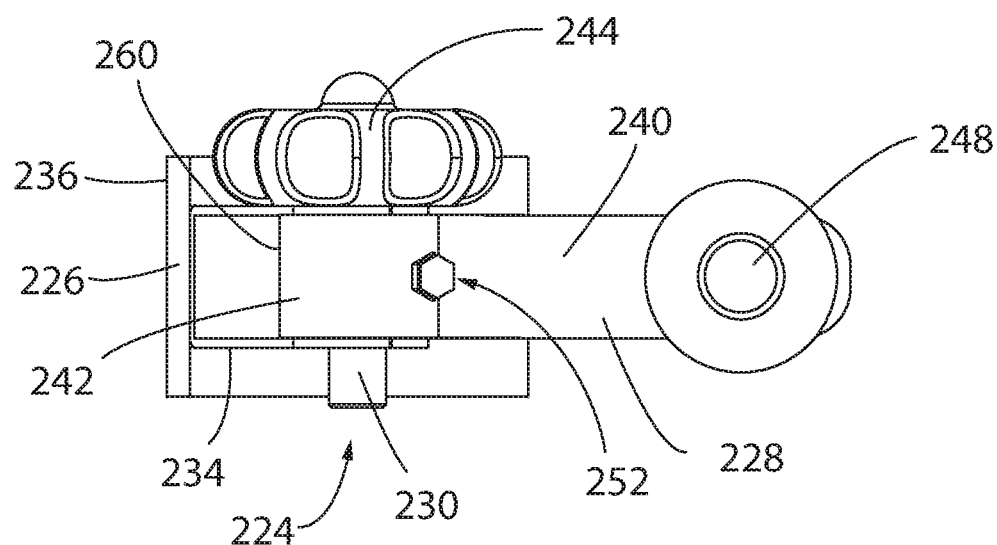
FIG. 18 is a top view of the mounting bracket of FIG. 17.

Next, FIGS. 16-18 depict a mounting bracket 224 of the camera mounting system 200. The mounting bracket 224 includes a tab 226 coupled to a base 228. In the representative embodiment of the invention, the tab 226 and the base 228 are pivotably coupled to each other via a hinge 230. The tab 226 includes a plate 232 and at least one extension 234 extending forward from the plate 232. In addition, a magnet 236 is adhered to a rear surface 238 of the tab 226. While the extensions 234 are shown as extending forward from the plate 232 at an angle perpendicular to the tab 226, it is contemplated that the extensions 234 may extend from the plate 232 at any angle.

The base 228 of the mounting bracket 224 include a generally horizontal portion 240 and an angled portion 242. While the angled portion 242 is shown as extending perpendicularly upward from the horizontal portion 240, it is contemplated that the angled portion 242 may extend from the horizontal portion 240 at any angle. In addition, while portion 240 is referred to as a generally horizontal portion, the portion 240 will not always be oriented horizontally. As the base 228 pivots about the hinge 230, the horizontal portion 240 will incline above or decline below horizontal. That is, the actual orientation of the horizontal portion 240 is dependent on the orientation of the base 228 and the tab 226 in addition to the orientation of the mount 202 within the tree 222. For the purposes of the present invention, the term horizontal portion 240 is used to distinguish the portion 240 from the angled portion 242.

As shown in FIG. 16, the angled portion 242 of the base 228 is configured to disposed between adjacent extensions 234 of the tab 226. In embodiments of the invention where the tab 226 includes a single extension 234, the angled portion 242 of the base 228 may be placed adjacent to and aligned with the extension 234. The angled portion 242 and the extensions 234 each have an orifice (not shown) formed therethrough and aligned to form an axis through which the hinge 230 extends to pivotably connect the tab 226 and the base 228. The hinge 230 may include a tensioning knob 244. The tensioning knob 244 may be rotated clockwise or counterclockwise to increase or reduce the tension, respectively, in the hinge 230, or vice versa. When the tension is increased, more force is required to pivot the tab 226 and the base 228. Conversely, when the tension is decreased, less force is required to pivot the tab 226 and the base 228.

Figure 19:
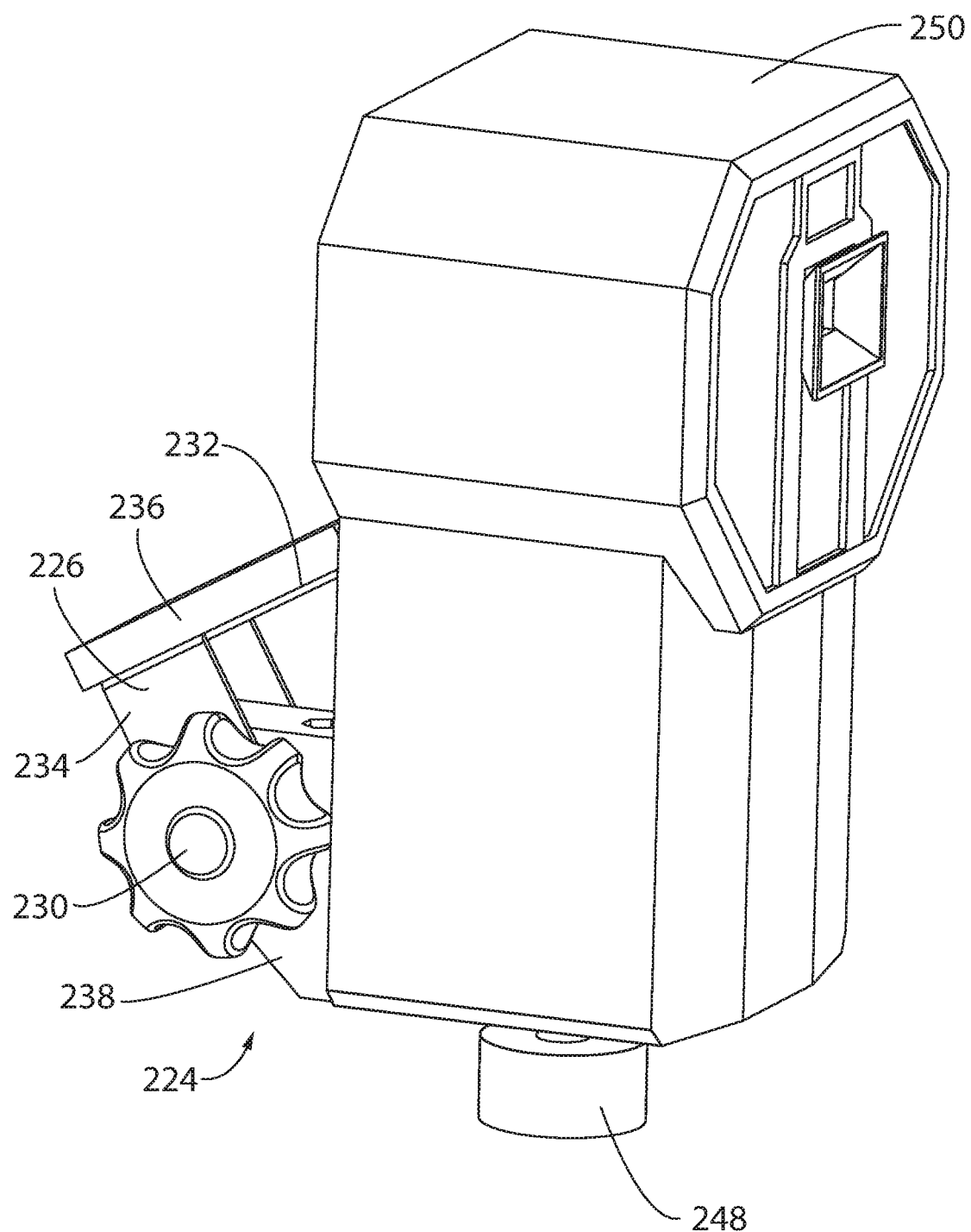
FIG. 19 is a perspective view of a game camera attached to the mounting bracket shown in FIGS. 16-18.

The horizontal portion 240 of the base 228 further includes at least one orifice 246 formed therethrough. While FIG. 16 depicts three (3) orifices 246, it is contemplated that varying embodiments of the invention may include more or less than three (3) orifices 246. In addition, at least one of the orifices 246 may be configured to be a slot. As shown in FIG. 19, a game camera 250 having a mounting nut on the base of the camera 250, may be secured to the base 228 via a fastener 248. The fastener 248 is configured to extend through the orifice 246 in the horizontal portion 240 of the base 228 and engage the mounting nut of the camera 250. In the representative embodiment of the invention, fastener 248 is a bolt and wobble washer. Once the camera 250 is secured to the base 228 via the wobble bolt 248, the wobble bolt 248 may be further rotate in order to adjust the camera 250 side to side and, therefore, adjust the view of the camera left and right. In other embodiments of the invention, the fastener 248 may be a normal bolt with or without a normal washer or any other mechanical fastener.

In addition, the base 228 may also include at least one tool orifice 252 formed through the base 228. The tool orifice 252 is configured to receive the bit 216 of the tool 214. In turn, the tool 214 may be used to pivot the base 228 about the hinge 230. As a result, the view of the camera may be adjusted up and down. In the representative embodiment of the invention, the tool orifice 252 includes first and second tool orifices 252a, 252b formed in the angled portion 242 of the base 228. The first tool orifice 252a extends from an upper surface 254 of the angled portion 242 to a lower surface 256 of the angled portion 242, while the second tool orifice 252b extends from a front surface 258 of the angled portion 242 to a rear surface 260 of the angled portion 242. In alternative embodiments of the invention, the first tool orifice 252a may be formed in the lower surface 356 of the angled portion 242 and extend partially through the angled portion 242, while the second tool orifice 252b may be formed in the rear surface 260 of the angled portion and extend partially through the angled portion 242. Further, embodiments of the invention may include only a single tool orifice 252. In yet other embodiments of the invention, the at least one tool orifice 252 may include a single orifice formed in a lower surface of the 262 of the base 228, either aligned with the angled portion 242 or the horizontal portion 240.

Figure 20:
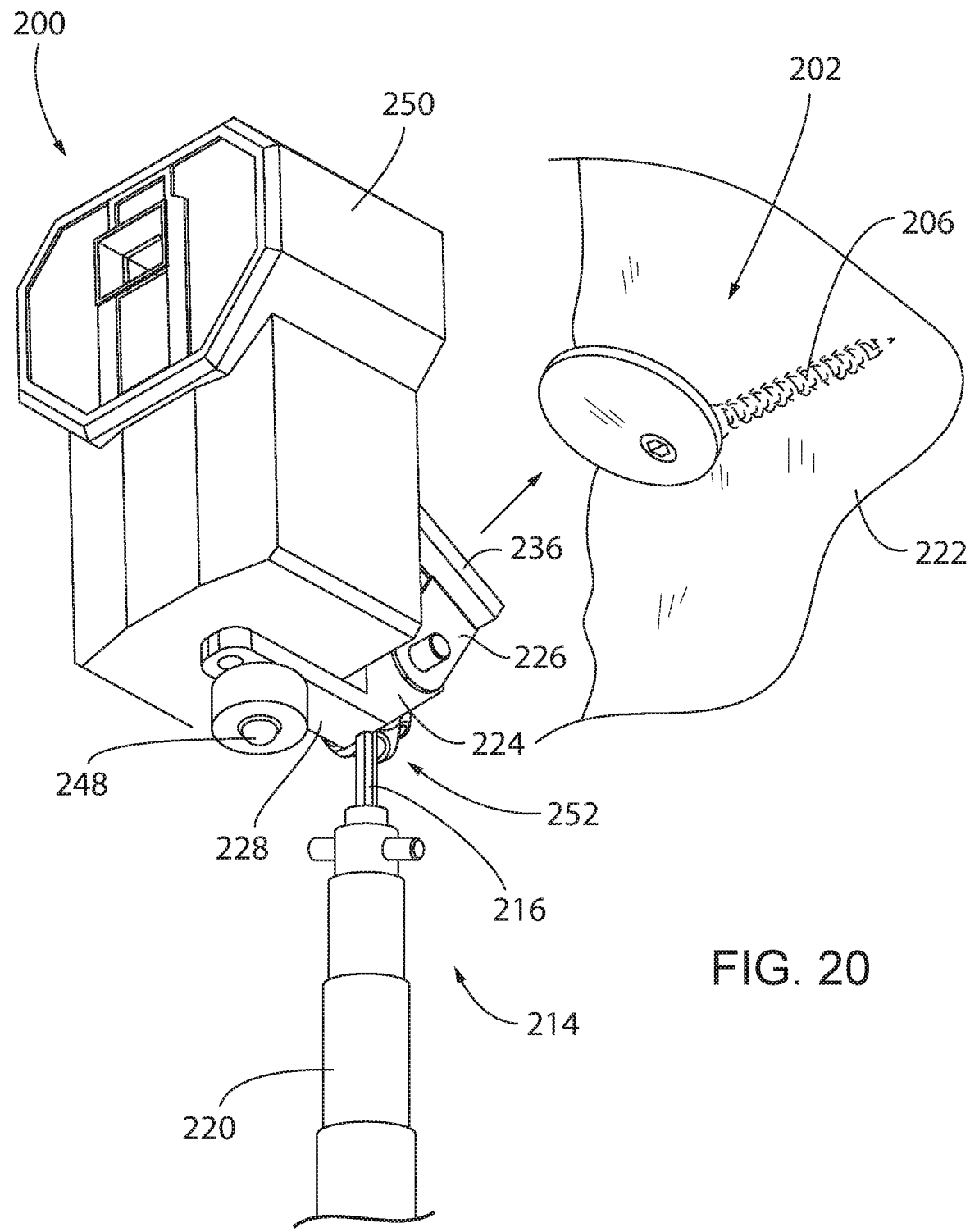
FIG. 20 is a perspective view of the mounting bracket of FIGS. 16-18 being attached to the mount of FIGS. 12-15 by way of the mounting tool.

FIG. 20 depicts the tool 214 being used to attach the mounting bracket 214 to the mount 202. The mounting bracket 224 may be mounting on the tool 214 by inserting the bit 216 into the tool orifice 252. The user is then able to lift the mounting bracket 224 and attached camera 250 with the tool 214 and place the magnet 236 of the tab 226 in contact with the plate 204 of the mount 202. In turn, the magnet 236 magnetically couples the mounting bracket 224 to the mount 202. As a result, the mounting bracket 224 and the mount 202 are removably coupled to each other. To remove the mounting bracket 224 from the mount 202, the user need only insert the bit 216 of the tool 214 into the tool orifice 252 and move or twist the tool to the side. Such movement results in the mounting bracket 224 being removed from the mount 202.

The components of the instant invention can be made of any suitable material. The screw heads and bits described above may be any appropriate screw head, including, but not limited to, 6-point star shaped (e.g., TORX™), hexagon shaped, square shaped, etc. When screwed into a tree, the angle of the longitudinal axis of the screw in relation to the plane of the plate of the screw and plate combination provides the option of rotating the plate to deferent angles, which together with hinge 14c, shown, for example, in FIG. 4, permits the angle of view of the mounted game camera to be readily adjusted. Socket 17 is especially suitable for making adjustments in camera viewing angle in combination with the telescoping pole shown in FIG. 8 by inserting the screw driver bit into socket 17.

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A camera mounting system comprising:
   a mount including:
      a plate; and
      a screw extending rearward of the plate;
   a mounting bracket removably coupled to the mount; the mounting bracket including:
      a tab; and
      a base pivotably coupled to the tab;
   wherein a camera is mounted to the mounting bracket.

2. The camera mounting system of claim 1 wherein at least one magnet is coupled to a surface of the tab of the mounting bracket in order to removably couple the tab of the mounting bracket to the plate of the mount.

3. The camera mounting system of claim 1 further comprising a tool having a bit and a telescoping pole;
   wherein the tool is configured to interfit with a head of the screw to secure the mount to a tree-like object; and
   wherein the tool is configured to interfit with an orifice formed in the mounting bracket to allow a user to removably couple the mounting bracket to the mount.

4. The camera mounting system of claim 3 wherein the base of the mounting bracket includes an orifice formed therein, the orifice configured to receive the tool for adjusting the orientation of the mounting bracket.

5. The camera mounting system of claim 4 wherein the tool adjusts the orientation of the mounting bracket by pivoting the base and manipulating a view of the camera vertically.

6. The camera mounting system of claim 1 wherein the screw extends from the plate at an angle less than perpendicular.

7. The camera mounting system of claim 1 wherein the screw includes a screw head aligned with a front surface of the plate.

8. The camera mounting system of claim 1 wherein the camera is mounted to the base via a fastener comprising a bolt and a wobble washer, the fastener is configured to manipulate a view of the camera horizontally.

9. The camera mounting system of claim 1 wherein the camera is mounted to the mounting bracket via at least one elastic band.

10. The camera mounting system of claim 1 wherein the base and the tab are pivotably coupled about a hinge.

11. The camera mounting system of claim 10, wherein the hinge includes a tensioning knob to increase or decrease the tension in the hinge.

12. A camera mounting system comprising:
a mount including:
  a plate; and
  a screw extending from a rear surface of the plate, the screw having a head aligned with a front surface of the plate;
a mounting bracket including:
  a tab removably coupled to the plate of the mount; and
  a base pivotably coupled to the tab via a hinge;
a tool having a bit, wherein the tool is configured to interfit with a head of the screw to secure the mount to a tree-like object, and wherein the tool is configured to interfit with an orifice formed in the mounting bracket to allow a user to lift the mounting bracket and removably couple the mounting bracket to the mount.

13. The camera mounting system of claim 12 wherein the mounting bracket includes at least one magnet adhered to a surface of the tab, wherein the tab and the plate of the mount are removably coupled via the magnet.

14. The camera mounting system of claim 12 wherein the hinge includes a tensioning knob to increase or decrease the requisite force to pivot the base about the hinge.

15. The camera mounting system of claim 12 further comprising an orifice formed in the base of the mounting bracket, wherein the orifice is configured to receive a fastener and secure a camera to the base of the mounting bracket.

16. The camera mounting system of claim 15 wherein the fastener includes a bolt and wobble washer configured to manipulate a view of the camera from side to side.

17. The camera mounting system of claim 12 wherein the tool is configured to interfit with with an orifice formed in the mounting bracket to pivot the base of the mounting bracket to manipulate a view of the camera up and down.

18. The camera mounting system of claim 12 wherein the tool includes a telescoping pole, and wherein the bit is secured to a distal end of the telescoping pole.

19. A camera mounting system comprising:
a mount including:
  a plate; and
  a screw extending from a rear surface of the plate at an angle, the screw having a head aligned with a front surface of the plate;
a mounting bracket including:
  a tab removably coupled to the plate of the mount; and
  a base pivotably coupled to the tab via a hinge;
a tool including:
  a telescoping pole; and
  a bit disposed at a distal end of the telescoping pole, the bit configured to interfit with a head of the screw to secure the mount to a tree-like object and configured to interfit with an orifice formed in the mounting bracket to allow a user to removably couple the mounting bracket to the mount;
a camera secured to the base of the mounting bracket via a fastener.

20. The camera mounting system of claim 19 further comprising at least one magnet coupled to a surface of the tab of the mounting bracket in order to removably couple the tab of the mounting bracket to the plate of the mount.

* * * * *